(12) United States Patent
Wang

(10) Patent No.: US 7,876,567 B2
(45) Date of Patent: Jan. 25, 2011

(54) FOLDABLE ELECTRONIC DEVICE AND LATCH MECHANISM APPLIED IN THE FOLDABLE ELECTRONIC DEVICE

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 30 days.

(21) Appl. No.: 12/330,579

(22) Filed: Dec. 9, 2008

(65) Prior Publication Data

US 2010/0053886 A1 Mar. 4, 2010

(30) Foreign Application Priority Data

Aug. 26, 2008 (CN) .................. 2008 1 0304198

(51) Int. Cl.
*H05K 7/16* (2006.01)
(52) U.S. Cl. ............. 361/726; 361/679.26; 361/679.02; 248/917
(58) Field of Classification Search ............ 361/679.01, 361/679.02, 679.55, 679.26, 726; 248/917–924; 455/575.1–575.4
See application file for complete search history.

(56) References Cited

U.S. PATENT DOCUMENTS

| 6,108,196 | A | 8/2000 | Jung | |
|---|---|---|---|---|
| 6,659,516 | B2 * | 12/2003 | Wang et al. | 292/251.5 |
| 6,848,662 | B2 * | 2/2005 | Paramonoff et al. | 248/309.1 |
| 6,890,008 | B1 * | 5/2005 | Chuang et al. | 292/121 |
| 7,082,035 | B2 | 7/2006 | Kim | |
| 7,385,809 | B2 * | 6/2008 | Graffius | 361/679.55 |
| 2004/0252465 | A1 * | 12/2004 | Hartman | 361/726 |

FOREIGN PATENT DOCUMENTS

| TW | 383877 | 3/2000 |
|---|---|---|
| TW | I234060 | 6/2005 |
| TW | M270634 | 7/2005 |
| TW | 301504 | 11/2006 |
| TW | M306675 | 2/2007 |
| TW | M314361 | 6/2007 |

* cited by examiner

*Primary Examiner*—Jayprakash N Gandhi
*Assistant Examiner*—Ingrid Wright
(74) *Attorney, Agent, or Firm*—Clifford O. Chi

(57) ABSTRACT

A foldable electronic device includes a first cover, a second cover rotatably connected to the first cover, and a latch mechanism. The latch mechanism includes a latching portion formed on the first cover and a catching unit positioned in the second cover. The catching cover includes a pivoted button. The pivoted button defines a catching structure to engage with the latching portion. The pivoted button is rotatably attached to the second cover. The pivoted button causes the catching structure of the pivoted button to engage with or disengage from the latching portion. A latch mechanism applied in the foldable electronic device is also provided.

14 Claims, 5 Drawing Sheets

FOLDABLE ELECTRONIC DEVICE AND LATCH MECHANISM APPLIED IN THE FOLDABLE ELECTRONIC DEVICE

BACKGROUND

1. Field of the Invention

The present disclosure generally relates to foldable electronic devices and latch mechanisms and, particularly, to a foldable electronic device having a top cover and a main body and a latch mechanism applied in the foldable electronic device.

2. Description of the Related Art

Portable electronic devices, such as notebook computers, are popular for their portability. When a notebook computer is not being used, a cover is flipped over a main body to protect a display on the cover and a keyboard on the main body and locked together by a typical latch mechanism. When the notebook computer is in use, the cover is opened from the main body.

However, the typical latch mechanism often has a sliding member attached to the cover. The cover is opened by sliding the sliding member with, for example, a finger, and separating the cover from the main body. The sliding member generally has a small outer surface area inconspicuously positioned on an edge of the cover. Thus, when sliding the sliding member to open the top cover, the finger may slip. As a result, opening the top cover may be bothersome.

Therefore, a new foldable electronic device is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

The present foldable electronic devices, may be notebooks, cell phones, media players, and so on. For the purposes of conveniently describing one embodiment of an electronic device, a notebook computer is used to describe the foldable electronic device of the present disclosure.

Figure 1:
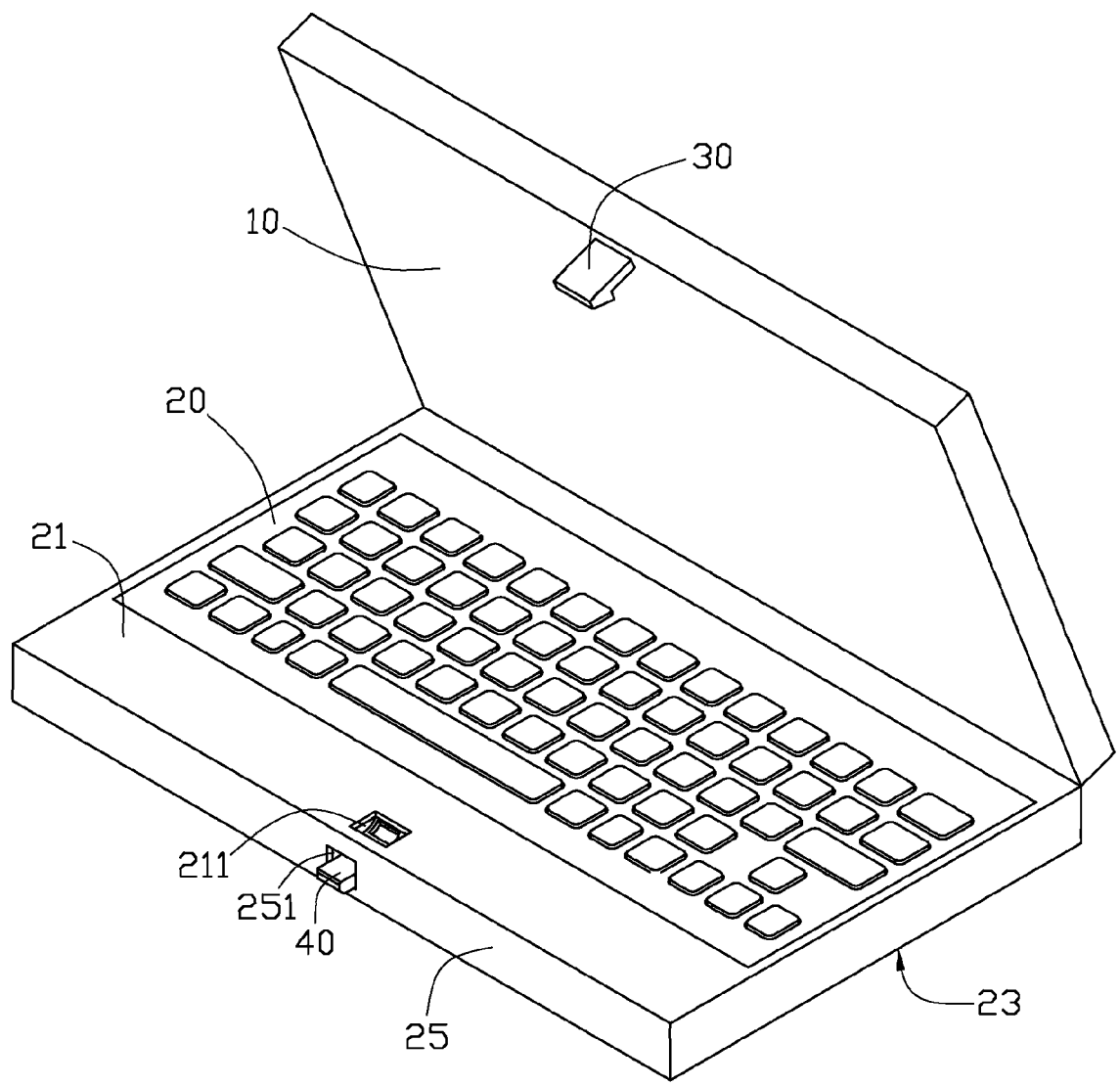
FIG. 1 is an assembled, isometric view of one embodiment of a foldable electronic device, the foldable electronic device including a top cover, a main body, and a latch mechanism.
Figure 2:
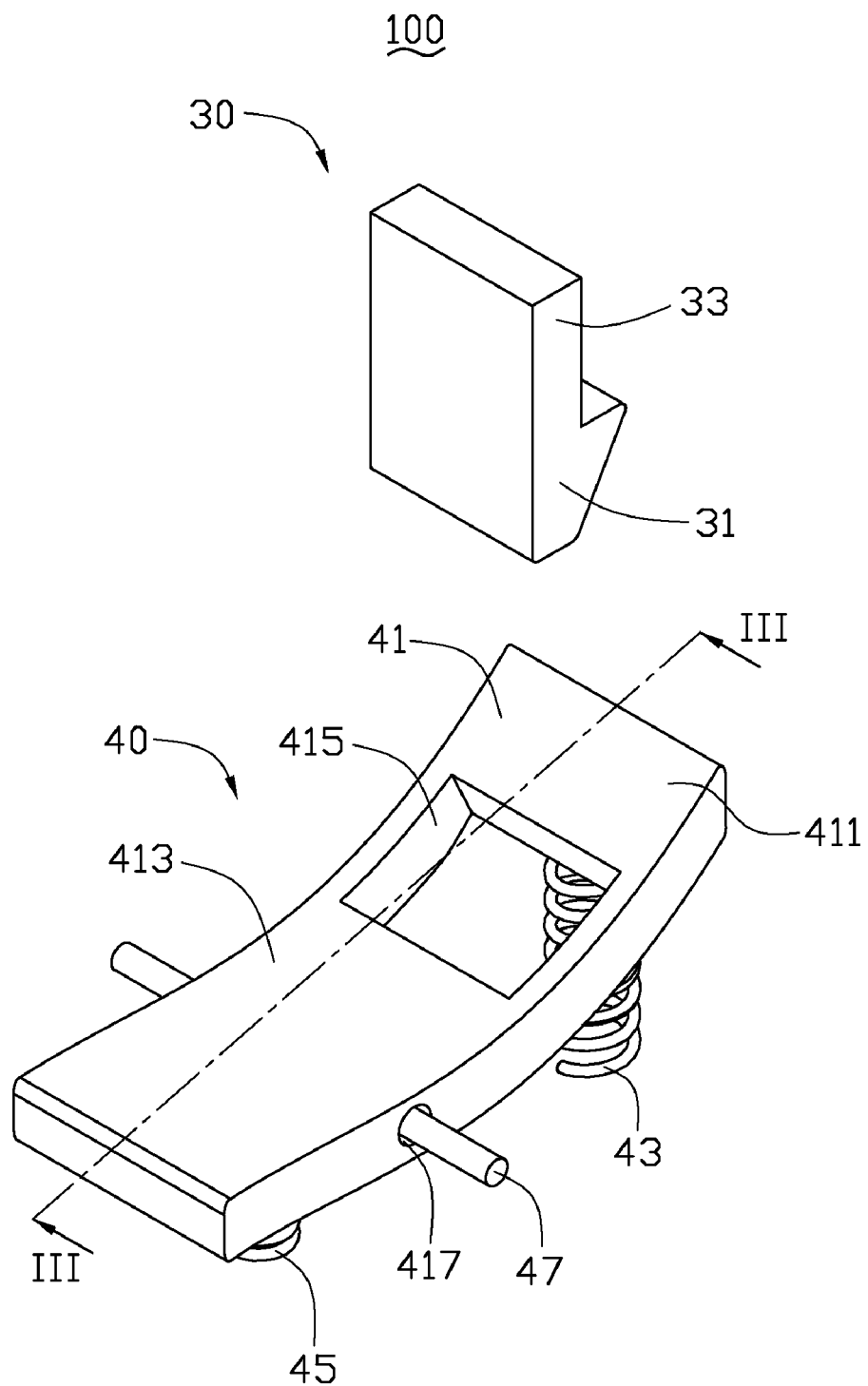
FIG. 2 is a partially exploded, isometric view of the latch mechanism of the foldable electronic device of FIG. 1.

Referring to FIG. 1, a notebook computer (not labeled) includes a top cover 10, a main body 20, and a latch mechanism 100 (see FIG. 2). The top cover 10 is rotatably mounted to the main body 20. The latch mechanism 100 includes a latching portion 30 formed on the top cover 10 and a catching unit 40 positioned in the main body 20.

The main body 20 includes a top wall 21, a bottom wall 23 opposite to the top wall 21, and a sidewall 25 connecting the top wall 21 to the bottom wall 23. The top wall 21 faces a display of the top cover 10. The top wall 21 defines an engaging opening 211 adjacent to an edge away from a hinged portion of the main body 20 hinged to the top cover 10. The sidewall 25 defines a button slot 251 communicating with the engaging opening 211.

Figure 3:
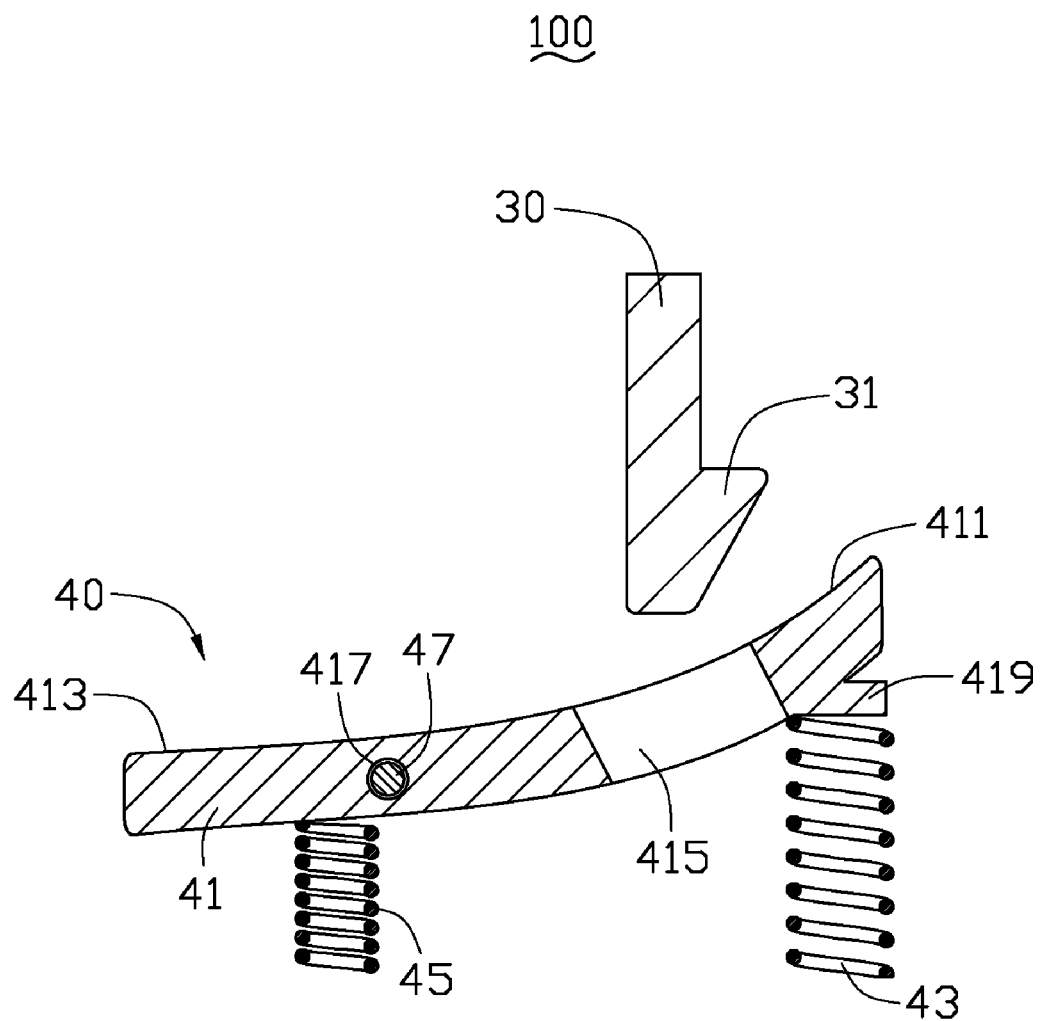
FIG. 3 is a cross-sectional view of the latch mechanism taken along line III-III of FIG. 2.

Referring also to FIG. 2 and FIG. 3, the latching portion 30 includes a hook 31 and a connecting arm 33 extending from the top cover 10. The hook 31 is formed from a free end of the connecting arm 33. The latching portion 30 is formed adjacent to an edge away from a hinged portion of the top cover 10 hinged to the main body 20, and faces the main body 20.

The catching unit 40 is configured to be fixed inside the main body 20 corresponding to the engaging opening 211 and the button slot 251. The catching unit 40 includes a pivoted button 41, a first resilient member 43, a second resilient member 45, and a pivot shaft 47. The pivoted button 41 is an arched sheet having an arched engaging portion 411 and an actuating portion 413 connected to an end of the engaging portion 411. The engaging portion 411 defines a notch 415 for engaging with the latching portion 30. The actuating portion 413 defines a transverse shaft hole 417 extending through opposite side surfaces of the actuating portion 413. The shaft hole 417 is configured for rotatably receiving the pivot shaft 47. The engaging portion 411 further forms a fixing protrusion 419 formed adjacent to an end away from the actuating portion 413.

The first and second resilient members 43, 45 may be helical, columnar springs. The resilient member 43 is a compression spring, and the resilient member 45 is an extension spring. Ends of the first resilient member 43 respectively resist the fixing protrusion 419 and the bottom wall 23. Ends of the second resilient member 45 respectively resist the actuating portion 413 and the bottom wall 23. The first resilient member 43 may be longer than the second resilient member 45 when the first and second resilient members 43, 45 are in a free state. The pivot shaft 47 may be a cylinder.

One end of each of the first and second resilient members 43, 45 is fixed to the bottom wall 23. The first and second resilient members 43, 45 are spaced apart from each other, with the second resilient member 45 being closer to the sidewall 25 than the first resilient member 43. The pivoted button 41 is positioned in the main body 20, with part of the actuating portion 413 protruding out of the main body 20 via the button slot 251 and the notch 415 facing the engaging opening 211 of the top wall 21. The pivot shaft 47 is rotatably inserted in the shaft hole 417 of the pivoted button 41 and a sidewall of the main body 20. The other ends of the first and second resilient members 43, 45 resist the pivoted button 41. The engaging portion 413 is oblique relative to the top wall 21. It should be noted that the top wall 21 should be assembled to the bottom wall 23 and the sidewall 25 after assembling the pivoted button 41 and the first and second resilient members 43, 45 in the main body 20.

Figure 4:
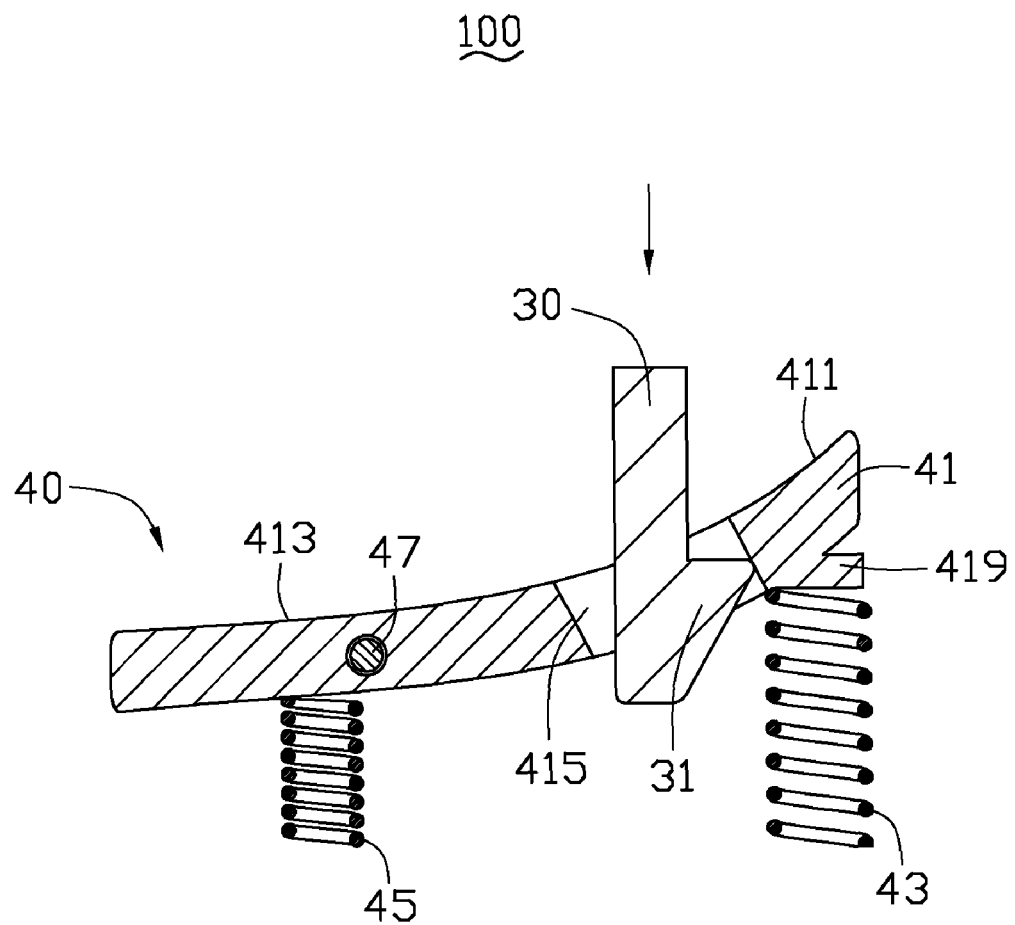
FIG. 4 is similar to FIG. 3, but showing a latching portion and a catching unit of the latch mechanism engaged with each other.

Referring to FIG. 4, to fold the notebook computer, an external force parallel to a direction of the arrow of FIG. 4 is applied to the top cover 10 to push the top cover 10 towards the main body 20, so that the latching portion 30 gradually moves into the engaging opening 211. When the latching portion 30 moves through a certain distance, the latching portion 30 resists the engaging portion 413 of the pivoted button 41 and further movement of the latching portion 30 forces the pivoted button 41 to rotate around the pivot shaft 47. The first resilient member 43 becomes compressed and the second resilient member 45 becomes extended. When the pivoted button 41 rotates to a certain angle, the latching portion 30 becomes caught by the notch 415, and thus, latched into the notch 415. When the external force is removed, an elastic force of the first and second resilient members 43, 45 forces the pivoted button 41 to rotate towards an original position. As such, the top cover 10 is latched to the main body 20.

Figure 5:
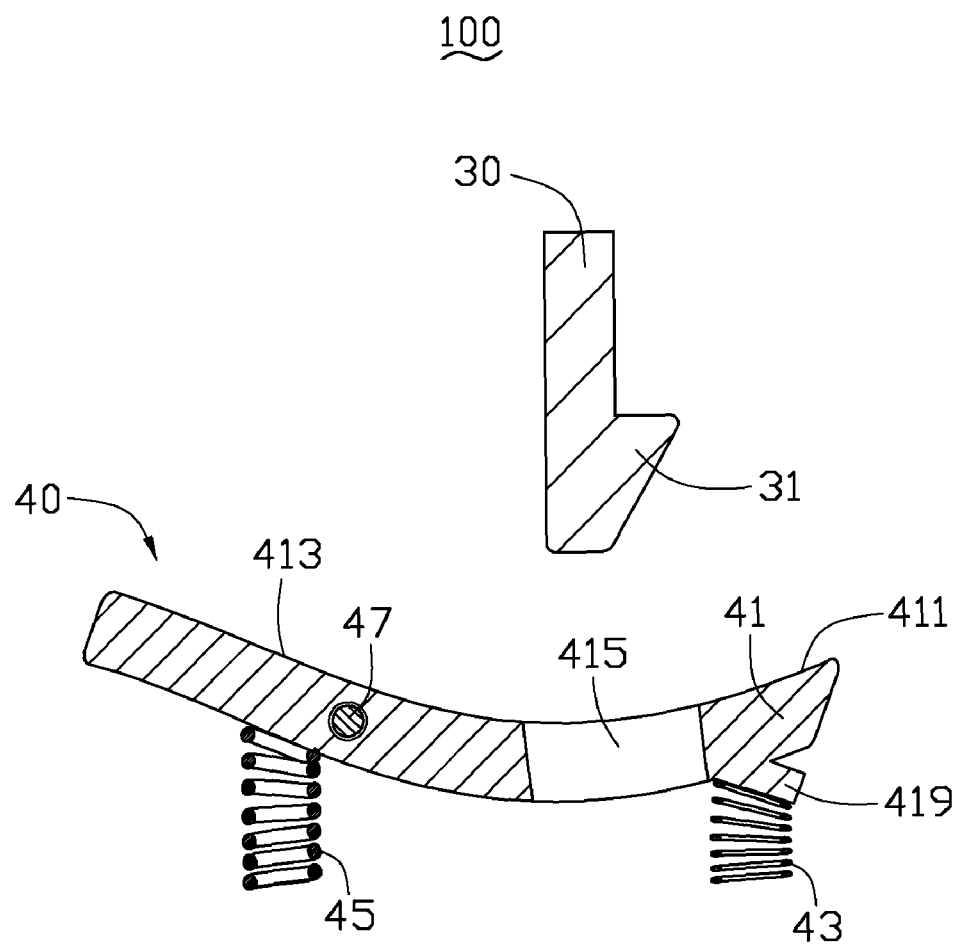
FIG. 5 is similar to FIG. 4, but showing a latching portion and a catching unit of the latch mechanism separated from each other.

Referring to FIG. 5, to open the top cover 10, another external force is applied to a free end of the actuating portion 413 of the pivoted button 41, thus forcing the pivoted button 41 to rotate around the pivot shaft 47. The first resilient member 43 is compressed and the second resilient member 45 is extended. When the pivoted button 41 rotates a certain angle, the latching portion 30 becomes detachable from the notch 415. At this moment, if an upward force is applied on the top cover 10, the latching portion 30 is freed from the notch 415 of the pivoted button 41, thereby unlatching the top cover 10 from the main body 20. The elastic forces of the first and second resilient members 43, 45 then force the pivoted button 41 to rotate and return to an original position.

In the illustrated embodiment, the top cover 10 is flipped opened by toggling the rotatable button 41. Therefore, when gripping the pivoted button 41, it is less likely to be slip when operated.

In alternative embodiments, only one of the first and second resilient members 43, 45 may be applied in the latch mechanism 100. The latching portion 30 may be positioned on the main body 20 and the catching unit 40 may be positioned on the top cover 10. The notch 415 may be another hook for engaging with the hook 31.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A foldable electronic device, comprising:
    a first cover;
    a second cover rotatably connected to the first cover; and
    a latch mechanism comprising:
        a latching portion formed on the first cover; and
        a catching unit positioned in the second cover, the catching unit comprising a pivoted button, a first resilient member, and a second resilient member, the pivoted button comprising an engaging portion defining a catching structure to engage with the latching portion and an actuating portion connecting to an end of the engaging portion;
    wherein the first resilient member resists the engaging portion and the second cover, the second resilient member resists the actuating portion and the second cover, and the pivoted button is rotatably attached to the second cover; the pivoted button causes the catching structure of the pivoted button to engage with or disengage from the latching portion.

2. The foldable electronic device of claim 1, wherein the first and second resilient members are columnar, helical springs; one of the first and second resilient members is a compression spring, and the other one of the first and second resilient members is an extension spring.

3. The foldable electronic device of claim 1, wherein the catching unit further comprises a pivot shaft; the pivoted button defines a shaft hole; the pivot shaft is rotatably inserted in the shaft hole and fixedly inserted in a sidewall of the main body, so that the pivoted button is rotatably connected to the main body.

4. The foldable electronic device of claim 1, wherein the second cover comprises a top wall, a bottom wall opposite the top wall, and a sidewall connecting the top wall to the bottom wall; the top wall defines an engaging opening; the sidewall defines a button slot communicating with the engaging opening; the pivoted button is received in the engaging opening and the button slot, with a part of the pivoted button protruding out of the second cover via the button slot.

5. The foldable electronic device of claim 4, wherein the latching portion comprises a hook and a connecting arm extending from the first cover, the hook is formed from a free end of the connecting arm.

6. The foldable electronic device of claim 5, wherein the catching structure is a notch defined in the pivoted button; the hook is configured to engage in the notch.

7. The foldable electronic device of claim 4, wherein the pivoted button is an arched sheet; the engaging portion has an arch shape, and the part of the pivoted button protruding out of the second cover via the button slot is a part of the actuating portion.

8. The foldable electronic device of claim 7, wherein a fixing protrusion is formed on the engaging portion adjacent to an end away from the actuating portion; the fixing portion resists one end of the first resilient member.

9. A latch mechanism, for a foldable device having a first cover and a second cover, the latch mechanism comprising:
    a latching portion; and
    a catching unit comprising a pivoted button, a first resilient member, and a second resilient member, the pivoted button comprising an engaging portion defining a catching structure to engage with the latching portion and an actuating portion connecting to an end of the engaging portion;
    wherein the first resilient member resists the engaging portion and the second cover, the second resilient member resists the actuating portion and the second cover, and the pivoted button is rotatably relative to the latching portion, the pivoted button causes the catching structure of the pivoted button to engage with or disengage from the latching portion.

10. The latch mechanism of claim 9, wherein the first and second resilient members are columnar, helical springs; one of the first and second resilient members is a compression spring, and the other one of the first and second resilient members is an extension spring.

11. The latch mechanism of claim 9, wherein the catching unit further comprises a pivot shaft; the pivoted button defines a shaft hole; the pivot shaft is rotatably inserted in the shaft hole.

12. The latch mechanism of claim 9, wherein the latching portion comprises a hook and a connecting arm, the hook is formed from an end of the connecting arm.

13. The latch mechanism of claim 12, wherein the catching structure is a notch defined in the pivoted button; the hook is configured to engage in the notch.

14. A foldable electronic device, comprising:
    a first cover;
    a second cover connected to the first cover; and
    a latch mechanism comprising:
        a latching portion positioned on the first cover; and
        a catching unit positioned on the second cover, the catching unit comprising a pivoted button, a first resilient member, and a second resilient member, the pivoted button comprising an engaging portion defining a catching structure and an actuating portion connecting to an end of the engaging portion;

wherein the first resilient member resists the engaging portion and the second cover, the second resilient member resists the actuating portion and the second cover, and the pivoted button is rotatable relative to the second cover between a first position and a second position; when the pivoted button is in the first position, the catching structure of the pivoted button engages with the latching portion; when the pivoted button is in the second position, the catching structure is disengaged from the latching portion.

* * * * *